United States Patent [19]

McNamara

[11] Patent Number: 4,496,816
[45] Date of Patent: Jan. 29, 1985

[54] MICROWAVE APPLIANCE FOR POPPING POPCORN

[75] Inventor: George McNamara, Minneapolis, Minn.

[73] Assignee: Leisure Technology, Inc., Minneapolis, Minn.

[21] Appl. No.: 491,361

[22] Filed: May 4, 1983

[51] Int. Cl.³ .............................................. H05B 9/06
[52] U.S. Cl. ............................ 219/10.55 E; 99/323.8
[58] Field of Search ............... 219/10.55 E; 99/323.8, 99/323.5, 323.7; 426/107, 241; D7/325

[56] References Cited

U.S. PATENT DOCUMENTS 3,774,523 11/1974 Moot ................................. 99/323.8
3,847,067 11/1974 Munsey .............................. 99/323.8
4,166,208 8/1979 Martel et al. ................ 219/10.55 E Primary Examiner—Clifford C. Shaw
Assistant Examiner—M. M. Lateef
Attorney, Agent, or Firm—James R. Cwayna

[57] ABSTRACT

A cooking apparatus particularly for use in a microwave oven and particularly designed for the popping of popcorn which incorporates a generally conical receptacle for the unpopped kernels with a butter or margarine melting receptacle therebelow. The conical portion is provided with a plurality of passages therethrough such that upon inversion of the unit, the melted butter or margarine will pass through such apertures to flow over and season the now popped kernels. The unit comprises a bowl-like structure which is removable from the conical unit and is useable as a serving dish. The butter or margarine receptacle is removable from the conical popping portion for separate filling thereof and a plurality of passages are provided in the conical section to permit the free flow of butter or margarine.

8 Claims, 8 Drawing Figures

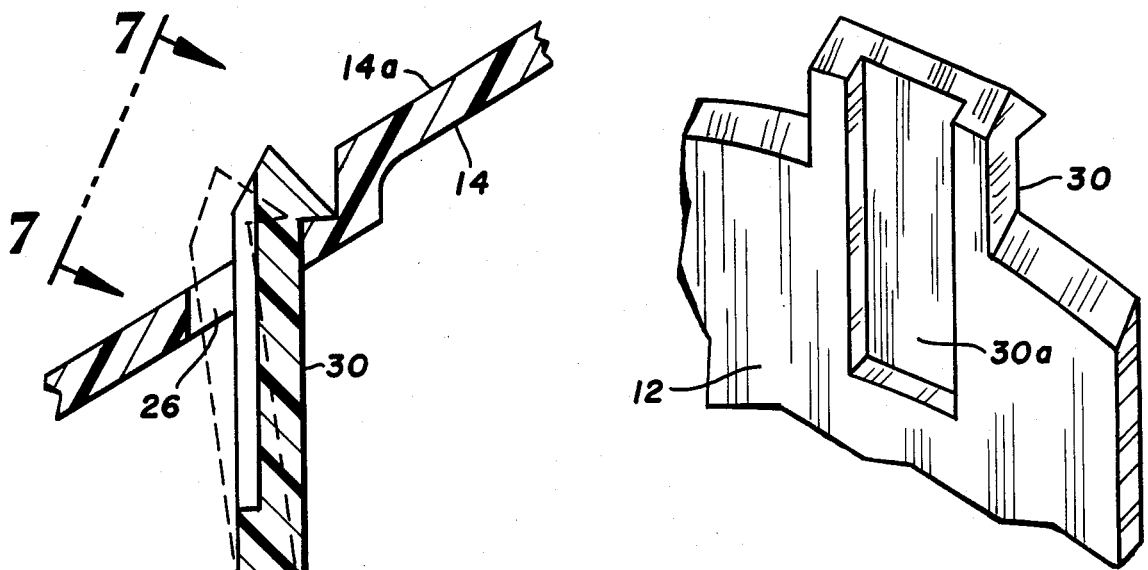
FIG.6
FIG.7
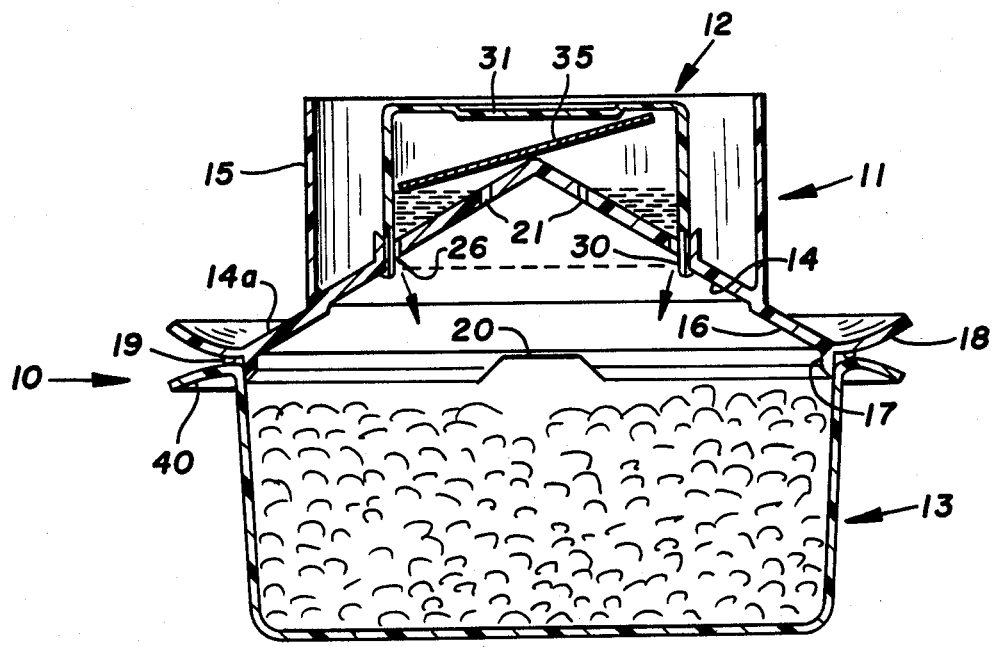
FIG.8

MICROWAVE APPLIANCE FOR POPPING POPCORN

FIELD OF THE INVENTION

This invention relates generally to appliances for use with and in microwave ovens and more specifically to an appliance for the popping of popcorn in a microwave oven with the addition of a butter or margarine heating portion for the melting of butter or margarine for flavoring of the popped kernels of popcorn.

PRIOR ART

In the applicant's review and search of the prior applicable art, two particular patents proved to be of any merit. These are two patents, both assigned to Raytheon Corporation, respectively, U.S. Pat. No. 4,156,806 Concentrated Energy Microwave Appliance and U.S. Pat. No. 4,166,208 Corn Popper with Butter Dispenser, are directed to an appliance for the popping of popcorn in a microwave oven. The prior art patents are both concerned with technicology for the popping of popcorn in a microwave oven and both relate to different degrees with the concentration of the microwave radiation to the kernels of corn. In addition to this concentration feature, they are both related to methods and structure for melting butter or margarine above the kernels to allow the melted seasoning to drip onto the popped kernels. The applicant's technique and structure provides a unit which requires the inversion of the unit to allow the butter or margarine to flow over the popped kernels and further provides a bowl for serving the same.

SUMMARY OF THE INVENTION

It is an object of this invention to provide an appliance for use with a microwave oven or the like for the popping of popcorn kernels which includes a butter or margarine melting portion which is normally positioned below the kernel retaining portion and which appliance is inverted after popping of the kernels to allow the melted butter or margarine to flow over the popped kernels.

It is another object of the applicant's invention to provide an appliance for use with a microwave oven or other energy device which incorporates a removable butter or margarine heating section which is removably detachable from the kernel heating section of the appliance for ease of filling thereof and which allows a flowing of butter or margarine onto the popped kernels of corn upon inversion of the unit.

It is still a further object of the applicant's invention to provide a popcorn popping appliance for use in and with a microwave oven or similar energy source which includes an unpopped kernel receptacle and a covering member overlying the same which, upon inversion will receive the popped kernels and will provide a serving dish for the popped kernels.

It is yet a further object of the applicant's invention to provide an appliance for use with a microwave oven or similar energy source for the popping of popcorn kernels which includes a kernel receptacle, a butter or margarine receptacle and a popped kernel receptacle such that the unpopped kernels may be received in the kernel receptacle, butter or margarine may be placed in the proper receptacle and the popped kernels and melted butter will be received into the popped kernel receptacle or serving dish when the unit is inverted.

These, together with other objects and advantages will become apparent from a consideration of the following description of a preferred form of the invention which is made in conjunction with the accompanying drawings in which the same numeral or indicia is utilized to indicate the same or similar parts and structure.

DESCRIPTION OF THE DRAWINGS

FIG. 6 is a vertical section taken substantially along Line 6—6 of FIG. 5 and particularly illustrating the connective and flow portion of the butter or margarine portion of the unit;

FIG. 7 is a view taken along Line 7—7 of FIG. 6 which more specifically illustrates the butter or margarine flow channel of the unit; and, FIG. 8 is a Vertical section taken substantially along Line 8—8 of FIG. 3 which is illustrative of the unit in its inverted position to deposit the popped kernels into the serving portion of the unit and to allow the melted butter or margarine to flow thereover.

DESCRIPTION OF A PREFERRED FORM OF THE INVENTION

Figure 1:
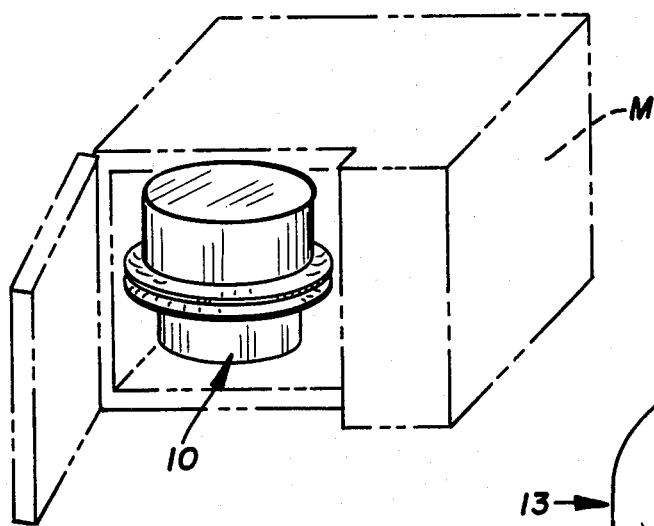
FIG. 1 is a perspective schematic view of the appliance embodying the concepts of the applicant's invention as the same would be used in a microwave oven or similar energy source.
Figure 2:
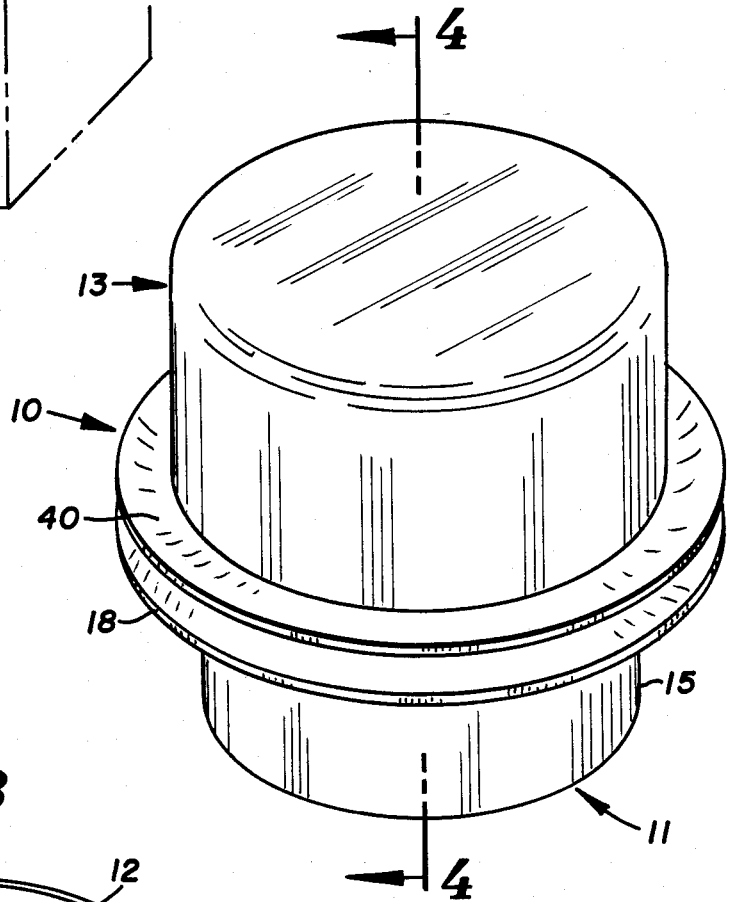
FIG. 2 is a perspective view of the appliance embodying the applicant's concept in the upright or popping mode.

As illustrated in the accompanying drawings, the applicant's popcorn popping unit for use in a microwave oven is generally designated 10 and the same is illustrated in a schematically illustrated microwave oven M in FIG. 1.

As stated, the concept of the applicant's invention is to place kernels of popcorn in a generally conical shaped container with a butter or margarine receptacle arranged therebelow. A deflector unit or concentration unit may be arranged in the butter or margarine receptacle. After popping of the corn and heating of the margarine or butter, the unit is inverted to shift the now popped kernels into a unit which serves as a cover element during popping and which serves as a serving dish thereafter and the melted butter or margarine will drip or flow over the popped corn.

Figure 3:
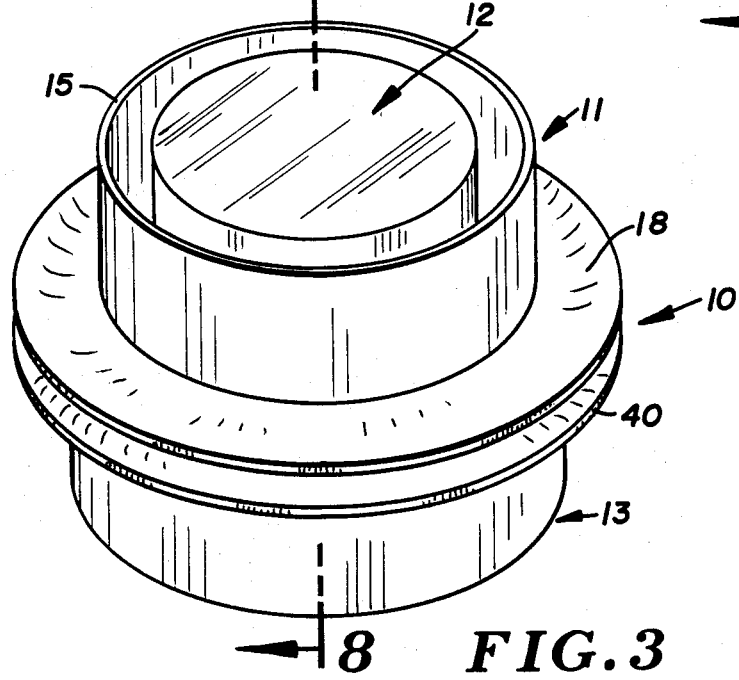
FIG. 3 is a perspective view of the applicant's appliance in an inverted or butter or margarine flow mode.
Figure 4:
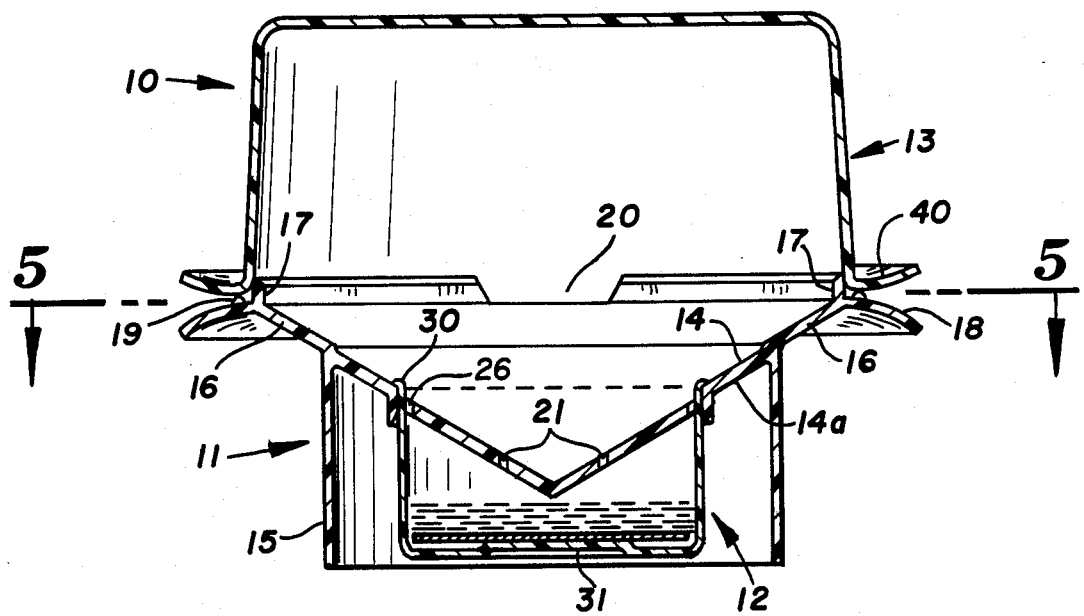
FIG. 4 is a vertical section taken substantially along Line 4—4 of FIG. 2.

The unit 10 is illustrated in the popping position in FIG. 1 and the cross section of FIG. 4 and in the butter or margarine flow position in FIGS. 3 and 8.

As illustrated, the unit 10 basically consists of three individual units including a kernel container 11, a butter or margarine receptacle 12 and a serving dish or cover 13.

The kernel receptacle or container 11 includes a generally conical inner surface 14 with a similar conical outer surface 14a. A generally cylindrical base member 15 extends from the outer or exterior surface 14a which will serve as a supporting base when the unit 10 is in the upright or popping position. The upper most end 16 of the conical surface 14 terminates in a longitudinally extending flange 17 and a radially extending lip or handle portion 18. The lip or handle portion is, in the form shown, curvilinearly formed in a rearward direction to the longitudinally extending flange 17. A plurality of spacing knobs 19 are formed on such handle portion to provide an air gap between the two sections 11, 13.

Figure 5:
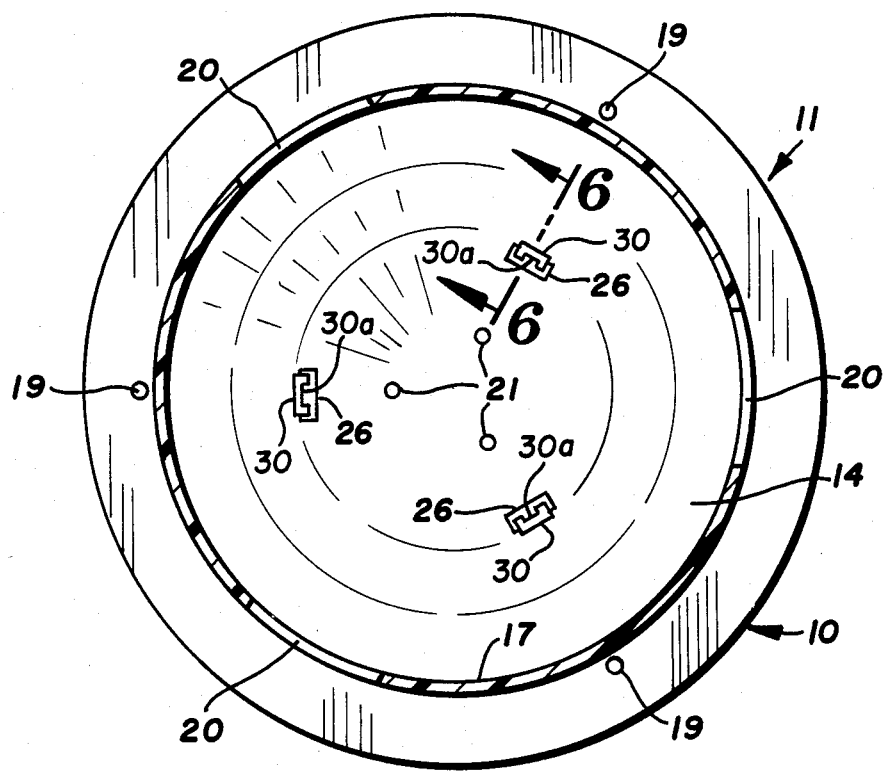
FIG. 5 is a horizontal section taken substantially along Line 5—5 of FIG. 4.

As particularly illustrated in the cross sections of FIGS. 4, 5 and 8, a plurality of notch portions 20 are formed in the longitudinally extending flange 17 to permit air flow therethrough.

As further illustrated in FIGS. 4, 5 and 8, a plurality of air flow or vacuum relief passages 21 are formed in the conical surfaces 14, 14a which are designed to allow the flow of air into the butter or margarine heating receptacle 12 such that the melted butter or margarine will flow therefrom when the unit is inverted.

As further illustrated, means for attaching the butter or margarine receptacle 12 to the kernel container 11 are provided on the conical surfaces 14, 14a. A plurality of slots 26 are provided on these surfaces and therefore, through the surfaces such that attachment legs 30 of the butter or margarine receptacle 12 may be inserted therethrough and held therein through a snap relation.

As illustrated, the butter or margarine receptacle 12 is of a closed end cylindrical or cup shape having a raised portion 31 in the closed end thereof. The receptacle 12 is provided with the attachment legs 30 extending from the open end thereof and each of the legs 30 is formed with a generally L-shaped construction with a slotted area 30a formed in the rear portion thereof, such rear portion being arranged within the confines of the cup shaped unit. These slots 30a will allow the flow of melted butter or margarine from the confines of the receptacle 12 when the unit is inverted and the relief passages 21 will release any created vacuum.

The structure of the legs 30 and the related apertures 26 will permit a removable attachment of the receptacle 12 to the kernel container 11.

A metallic disc 35 may be provided within the butter or margarine receptacle for retardation of energy transfer to the butter or margarine such that the same will not become excessively hot. Such disc is designated 35 and it should be considered that the inclusion of the same is a matter of choice and, as illustrated in FIGS. 4 and 8, the melted butter or margarine will flow thereunder and likewise flow thereover when in melted condition.

The popped kernel receptacle or serving dish 13 provides and is constructed as a closed end, cylindrical member having a radially outwardly extending lip 40 at the open end thereof, said lip being smoothly curved in a rearward direction of said cylinder. The formation of lip 18 of the kernel section 11 and the lip 40 of the serving section 13 combine to form a comfortable handle unit for ease of inversion or other shifting of the unit.

It should be obvious that the inner diameter of the serving dish or cover section 13 is of a size to be received about the extending flange 17 of the kernel receiving section.

The spacing provided by the extending knobs 19 and the notches 20 formed in the kernel receiving section provide sufficient air flow from the unit, as the kernels are being popped to maintain the cover or serving section 13 in proper position upon the kernel receiving section 11 during the popping operation.

The slots formed in the attachment legs connecting the butter or margarine receptacle to the kernel receiving portion, in combination with the venting apertures allow for sufficient and rapid flow of the butter or margarine from its receptacle when the same is inverted.

With the unit as provided by the applicant, it should be obvious that a unique, invertable unit is made available which will not allow for dispensing of the butter or margarine to unpopped kernels as is available with units which provide for top melting of the butter or margarine.

The applicant's device then provides a unit which will more positively insure the proper popping of kernels of corn as they will remain in a dry condition during the popping cycle. Applicant's unit also allows the user to select the amount of butter or margarine that is to be applied to the popped corn and the plurality of flow apertures will more throughly provide for proper distribution of the melted butter or margarine.

What is claimed is:

1. An appliance for popping of popcorn and simultaneously heating butter or margarine to be applied thereto after popping, such appliance including:
    a. kernel receiving portion providing a generally conical inner, kernel receiving surface and a generally outer conical surface;
    b. a support member extending from said outer surface for support of the appliance;
    c. a cover member having a predetermined dimension to receive the popped kernels of corn therein and normally covering said kernel receiving portion during the popping of the kernels of corn;
    d. a receptacle underlying and removably attached to said kernel receiving portion arranged and constructed to receive and retain a predetermined quantity of a meltable flavoring substance;
    e. attachment means for removably attaching said receptacle against said outer surface of said kernel receiving portion; and,
    f. said attachment means including flow passages to define flow paths for the flow of flavoring substance from said receptacle to the inner portion of said kernel receiving portion onto the popped kernels of corn when the appliance is inverted.

2. The structure set forth in claim 1 and a plurality of venting apertures formed in said conically shaped kernel receiving portion and communicating with said receptacle for the admission of air thereto when the appliance is inverted and whereby the flavoring substance is permitted to flow.

3. The structure set forth in claim 1 and means for attaching said receptacle including a plurality of longitudinally extending leg members having substantially L-shaped portions of the ends thereof and said kernel receiving portion having a plurality of slots therein to receive said legs for removably receiving and holding the same therein.

4. The structure set forth in claim 3 and said extending legs having flow slots longitudinally formed therein to provide flow passages for said flavoring substance.

5. The structure set forth in claim 1 and spacing knobs being formed between said cover member and said kernel receiving portion to permit air to escape from the area between said cover and said kernel receiving portion during heating and popping of the kernels of corn.

6. The structure set forth in claim 1 and said kernel receiving portion being provided with a longitudinally extending flange and said cover member being receivable about said flange for positioning thereof.

7. The structure set forth in claim 6 and said flange of said kernel receiving portion being provided with a plurality of slots for air flow therefrom.

8. The structure set forth in claim 1 and a metallic disc member being positionable within said flavoring substance receptacle.

* * * * *